UNITED STATES PATENT OFFICE.

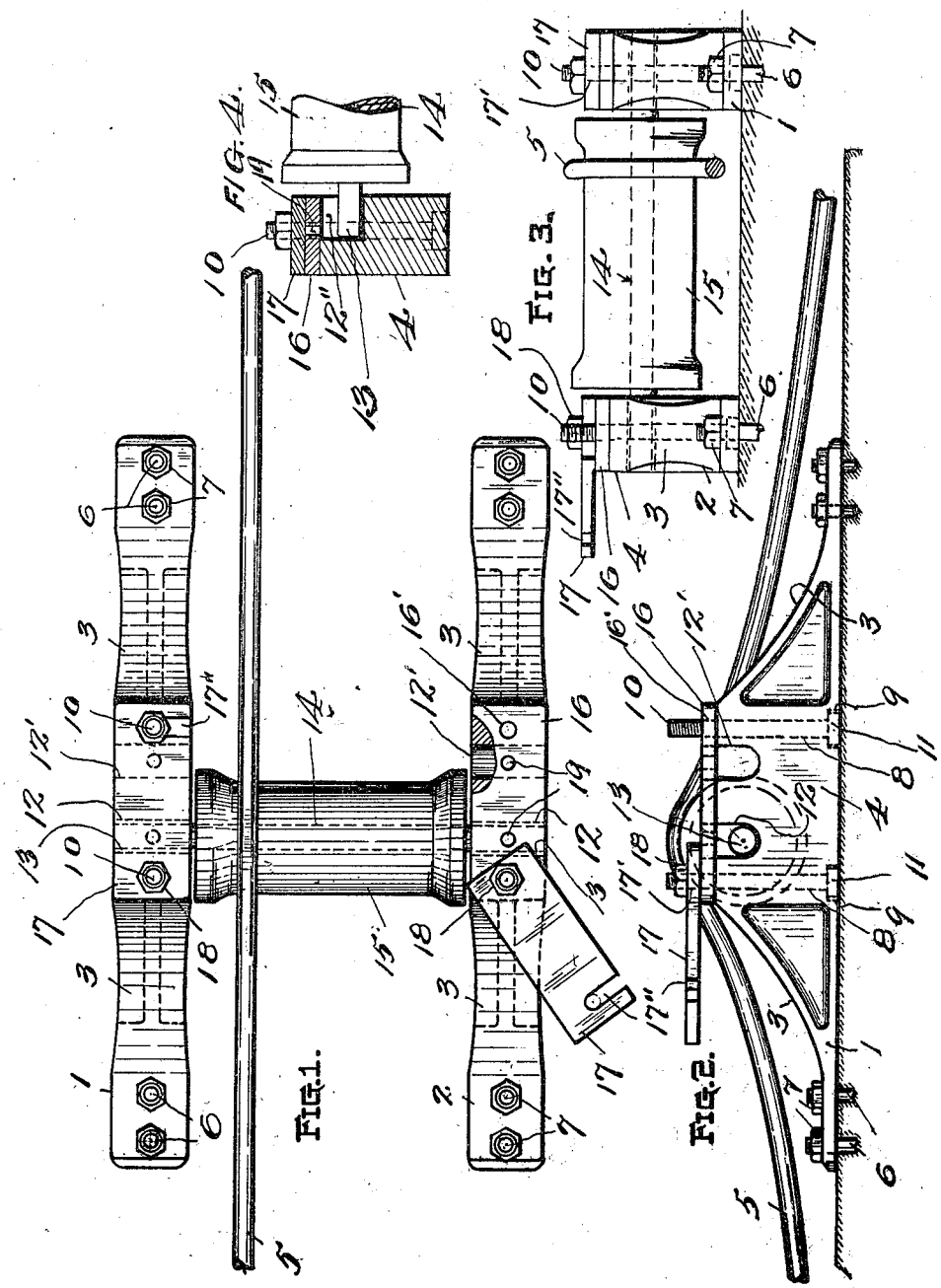

GEORGE J. POLLOCK, OF SMOCK, PENNSYLVANIA.

JOURNAL-BEARING.

1,046,640.

Specification of Letters Patent. Patented Dec. 10, 1912.

Application filed October 26, 1911. Serial No. 656,833.

*To all whom it may concern:*

Be it known that I, GEORGE J. POLLOCK, a citizen of the United States, residing at Smock, in the county of Fayette and State of Pennsylvania, have invented certain new and useful Improvements in Journal-Bearings, of which the following is a specification.

The present invention relates to improvements in journal bearings, particularly as applied to haulage rollers and cables.

The object of the invention is to provide a durable journal support for rollers, known as haulage rollers, as customarily used on inclines in mines, and to provide simple means for permitting access to the journal bearing, either to dismount the roller, or change its bearings, and also for oiling the bearings.

The invention consists essentially in novel arrangements and combinations of parts as hereinafter set forth.

In the drawings I have illustrated one example, and a modified form thereof, of the best mode I have so far devised for the practical application of the invention.

Figure 1 is a plan view of an exemplifying structure embodying the features of the invention, showing a roller journaled in brackets, and a cable passing over the roller, one of the journal cap-plates being swung out of position to permit oiling of the bearing. Fig. 2 is a side elevation of Fig. 1. Fig. 3 is an end elevation of Fig. 1 as seen from the right. Fig. 4 is a vertical transverse section showing a modified form of bearing.

In the preferred embodiment of my invention I utilize two complementary brackets 1 and 2, preferably of metal. These brackets are formed with curved or sloping surfaces 3 at each side of the central portion 4, to permit smooth sliding of the rope or cable 5, and avoid tangling or wear of the rope due to the accidental, and sometimes unavoidable, contact of the cable with the brackets. A proper foundation for the brackets is furnished and the brackets may be secured thereto by means of bolts 6 and nuts 7; and the brackets are further provided with long vertical bolt holes 8 with countersunk recesses 9 to accommodate the bolts 10 and their heads 11 respectively.

Bearings 12, 12' are provided in the brackets for the journals 13, 13, of the spindle 14 incased within and secured to rotate with the roller 15. As plainly shown in the drawings, the bearings 12, 12' are open recesses, extending a distance from the top of the central portion 4 of the brackets, and are formed with a rounded bottom, for the reception of the journals.

In Fig. 4, a modified form of bearing is indicated at 12'', wherein the outer end of the recessed bearing is closed. The upper portions of the bearings are closed by a pair of cap plates 16 and 17. These plates are provided with openings for the bolts 10, the plates 16 having a pair of openings 16', and the plates 17 having an opening 17' through which the bolts 10 project, and the plate 17, in addition is formed with an open slot 17'' to close about one of the bolts 10. The bolts 10 and plates 16 and 17 are secured in place by means of the nuts 18.

To increase the life of the brackets I have found it convenient and desirable to provide duplicate recesses in each bracket, so that when the journal bearings of one set of recesses become worn, the roller and its journals may be shifted to the other set.

When the open recesses forming bearings 12 for the journals are in use, the bearings may be oiled by placing the spout of the oil can in the recesses, as seen in Fig. 2. When the closed recessed bearing 12'' is used, oil holes 19 are utilized, these being provided in the plates 16, and the oil can spout may be entered in these holes to feed oil to the bearings. To afford access to the oil holes 19 in the plates 16, the upper cap plate 17 may be swung on one of the bolts 10, as a pivot (seen in Fig. 1) thus uncovering both holes 19 and the bearing may be oiled.

In dismounting the roller, as for instance when shifting the roller from one bearing to another, the nuts 18 are first unscrewed, and then the plates 16 and 17 withdrawn from the bolts 10. The roller may now be shifted, or turned end for end, and located in its bearings, and the cap plates replaced to hold the journals in place.

Having thus fully described my invention, what I claim as new and desire to secure by Letters Patent is:—

The combination with a roller and its journals of a pair of brackets each formed with a recess to receive said journals, a pair of perforated cap plates covering each recess, bolts for securing said plates, and one of said cap plates in each pair having oil holes therein and the other formed with an open slot to close about one of said bolts whereby the plate may be swung on the other bolt as a pivot for the purpose described.

In testimony whereof I affix my signature in presence of two witnesses.

GEORGE J. POLLOCK.

Witnesses:
 ELIAS MORRIS,
 CLARK HIGBEE.